(12) United States Patent  (10) Patent No.: US 8,838,823 B2
Guo et al.  (45) Date of Patent: Sep. 16, 2014

(54) PERFORMANCE AWARE PEER-TO-PEER CONTENT-ON-DEMAND

(75) Inventors: Yang Guo, Plainsboro, NJ (US); Saurabh Mathur, Monmouth Junction, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 47 days.

(21) Appl. No.: 12/227,954

(22) PCT Filed: Jun. 27, 2006

(86) PCT No.: PCT/US2006/024974
§ 371 (c)(1),
(2), (4) Date: Dec. 3, 2008

(87) PCT Pub. No.: WO2008/002295
PCT Pub. Date: Jan. 3, 2008

(65) Prior Publication Data
US 2009/0177792 A1  Jul. 9, 2009

(51) Int. Cl.
*G06F 15/16* (2006.01)
(52) U.S. Cl.
USPC .......................... 709/231; 709/202; 709/205
(58) Field of Classification Search
USPC ........................................ 709/231, 202, 205
See application file for complete search history.

(56) References Cited

U.S. PATENT DOCUMENTS

| | | | |
|---|---|---|---|
| 6,785,768 B2 * | 8/2004 | Peters et al. ................... | 711/112 |
| 7,174,385 B2 | 2/2007 | Li | |
| 7,325,073 B2 | 1/2008 | Shao et al. | |
| 7,593,333 B2 | 9/2009 | Li et al. | |
| 7,644,173 B1 * | 1/2010 | Zhang ............................ | 709/231 |
| 7,925,781 B1 * | 4/2011 | Chan et al. ..................... | 709/238 |
| 2002/0161898 A1 | 10/2002 | Hartop et al. | |
| 2005/0055718 A1 | 3/2005 | Stone | |
| 2005/0076098 A1 | 4/2005 | Matsubara et al. | |

(Continued)

FOREIGN PATENT DOCUMENTS

CN        1464751        12/2003
JP     2004213508 A      7/2004

(Continued)

OTHER PUBLICATIONS

Thommes et al. "BitTorrent fairness: analysis and improvements"; Workshop Internet, Telecom. and Signal Processing Conference Proceedings; Dec. 2005.*

(Continued)

*Primary Examiner* — Oscar Louie
*Assistant Examiner* — Lin Liu
(74) *Attorney, Agent, or Firm* — Robert D. Shedd; Jeffrey M. Navon

(57) ABSTRACT

A method is described including receiving a streamed leading content sub-clip, determining a set of needed content sub-clips, locating one of the set of needed content sub-clips and downloading the located content sub-clip. A system for providing content-on-demand is described having a peer, a server and a tracker. The tracker may be co-located with the server. The peer includes means for receiving a streamed leading content sub-clip, means for determining a set of needed content sub-clips, means for locating one of the set of needed content sub-clips and means for downloading the located content sub-clip.

18 Claims, 4 Drawing Sheets

(56) References Cited

U.S. PATENT DOCUMENTS

| | | | |
|---|---|---|---|
| 2006/0053209 A1* | 3/2006 | Li | 709/217 |
| 2006/0069778 A1 | 3/2006 | Ikegawa | |
| 2006/0168012 A1* | 7/2006 | Rose et al. | 709/206 |
| 2006/0190615 A1* | 8/2006 | Panwar et al. | 709/231 |
| 2006/0218620 A1* | 9/2006 | Nadarajah et al. | 725/151 |
| 2007/0028133 A1* | 2/2007 | Izutsu et al. | 714/4 |
| 2007/0113096 A1* | 5/2007 | Zhu et al. | 713/180 |
| 2007/0250880 A1* | 10/2007 | Hainline | 725/97 |
| 2008/0134258 A1* | 6/2008 | Goose et al. | 725/91 |

FOREIGN PATENT DOCUMENTS

| | | |
|---|---|---|
| JP | 200625408 | 1/2006 |
| JP | 200680659 | 3/2006 |
| WO | 2004-066160 A | 8/2004 |

OTHER PUBLICATIONS

Jeon, W. J. et al. "Peer-To-Peer Multimedia Streaming and Caching Service," Multimedia and Expo, 2002. ICME '02. Proceedings. 2002 IEEE International Conference on Lausanne, Switzerland Aug. 26-29, 2002, Piscataway, NJ USA, IEEE, US, vol. 2, Aug. 26, 200, pp. 57-60. XP010604697.

Lihang, Ying et al. "pcVOD: Internet Peer-To-Peer Video-On-Demand With Storage Caching on Peers," Proceedings of the International Conference on Distributed Multimedia Systems. Sep. 1, 2005, XP002460362.

Sharma, A. et al. "dPAM: A Distributed Prefetching Protocol for Scalable Asynchronous Multicast in P2P Systems." Infocom 2005. 24th Annual Joint Conference of the IEEE Computer and Communications Societies. Proceedings IEEE Miami, FL, USA Mar. 13-17, 2005, Piscataway, NJ USA, IEEE, vol. 2, Mar. 13, 2005, pp. 1139-1150, XP010829219.

Yang, Guo. et al. "Supporting VCR Operation in a Mesh-Based P2P VoD System" Consumer Commmunications and Networking Conference, 2008. CCNC 2008. 5th IEEE, IEEE CCP, Piscataway, NJ USA, Jan. 1, 2008, pp. 452-457, XP031211916.

Supplementary European Search Report dated Aug. 21, 2009.

International Search Report, dated Mar. 21, 2007.

Dana et al, "BASS: BitTorrent Assisted Streaming System for Video-On-Demand", Multimedia Signal Processing, 2005 IEEE 7th Workshop, Oct. 30, 2005.

* cited by examiner

PERFORMANCE AWARE PEER-TO-PEER CONTENT-ON-DEMAND

This application is a National Stage Application and claims the benefit, under 35 U.S.C. § 365 of International Application PCT/US2006/024974 filed Jun. 27, 2006, which was published in accordance with PCT Article 21(2) on Jan. 3, 2008 in English, and which claims.

FIELD OF THE INVENTION

The present invention relates to peer-to-peer networking and in particular, the provision of video-on-demand services using a peer-to-peer network that provides peer video downloading (downloading of data/video by peers in a peer-to-peer network) taking system performance into account.

BACKGROUND OF THE INVENTION

Traditionally, the client-server service model has been used to provide streaming service. A client sends a request to a server, which then streams the content to the client if the server has enough resources to serve the client's request and there is enough bandwidth along the path between the server and the client.

Due to the limited computation and storage resource at the server and limited bandwidth in the network connecting the server and clients, scalability has been an issue with client-server streaming service. Recently, peer-to-peer techniques have been introduced into streaming service. Peers are implemented with the capabilities of clients and servers and contribute to alleviate the workload imposed on the server and distribute the bandwidth requirements across the network by actively caching the content and serving other peers. Studies have shown that peer-to-peer techniques greatly improve system scalability, enabling the system to serve many much more users.

There have been significant efforts to address the scalability issue presented in streaming media service using peer-to-peer networking. These efforts can be classified into two categories notably peer-to-peer live streaming and peer-to-peer stored video streaming or video-on-demand. While both services strive to support a large number of users using peer-to-peer technology while offering users good viewing quality, they also face different technical challenges. In peer-to-peer live streaming, minimizing the start-up delay without sacrificing the system scalability is the challenge. In peer-to-peer video-on-demand service, allowing asynchronous users to share is the challenge.

Peer-to-peer streaming schemes also distinguish themselves by the different data dissemination techniques. Two data dissemination methods have been investigated—notably the overlay-based approach and the data-driven approach. In the overlay-based approach, the peers form a mesh or tree structure where parent-child relationships are formed among the peers. A child peer receives data from its parent. In contrast, the peers in the data-driven approach do not have fixed parent-child relationships. The peers look for the missing data, and retrieve the missing data wherever available. While the overlay-based approach is widely used in early peer-to-peer efforts, the data-driven approach is becoming more popular since it addresses the churn and asymmetric bandwidth problem effectively.

While most of the prior art efforts exhibit good scalability and support a greater number of users compared to a traditional client-server service model, the prior art schemes are best-effort in nature and the support of system performance requirements has not, been fully investigated.

SUMMARY OF THE INVENTION

The present invention is directed towards a performance aware peer-to-peer video-on-demand service. The present invention incorporates peer-to-peer downloading into the traditional client-server video-on-demand service model. The peer-to-peer downloading carries the major data transfer load and, thus, significantly reduces the workload imposed on the server. The server thus, devotes most of its resources to providing urgent data to meet the performance requirement. The perceived performance at the client end is improved. The peer-to-peer downloading algorithm is designed with the performance requirement in mind.

Video-on-demand service allows users to select and watch video content over a network whenever they want. The present invention includes a segmented peer-to-peer video sharing model that enables content sharing in a video-on-demand setting. The performance issue is addressed by incorporating a performance aware peer-to-peer data downloading algorithm and server-assisted complementary streaming that collectively realize performance similar to the performance offered by the traditional client-server service model but supporting more users/requests.

The method and system of the present invention are directed towards peer-to-peer video-on demand service using a data-driven approach and incorporating a real-time scheduling algorithm into the peer-to-peer data dissemination process to improve the user's viewing experience. It should be noted that system performance, in particular the timely receipt by the user of the requested video, means that the user's overall viewing experience is improved and the overall video quality is improved. The system performance aware data sharing and complementary server streaming of the present invention improves the viewing quality at client/user end.

A method for providing video-on-demand service is described including receiving a streamed leading video sub-clip, determining a set of needed video sub-clips, locating one of the set of needed video sub-clips and downloading the located video sub-clip. A system for providing video-on-demand is described having a peer, a server and a tracker. The tracker may be co-located with the server. The peer includes means for receiving a streamed leading video sub-clip, means for determining a set of needed video sub-clips, means for locating one of the set of needed video sub-clips and means for downloading the located video sub-clip.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Users of video-on-demand service watch different portions of video at any given moment. In order to enable the content sharing among users and maximize the amount of content that is delivered through a peer-to-peer network, it is assumed that each user has the storage capacity to cache a partial copy and/or the entire copy of content that has been played. This is a reasonable assumption given the rapidly increasing storage capacity of video playback devices. It should be noted that a video playback device is any device capable of receiving and playing back video (stored or live) including but not limited to computers, laptops, personal digital assistants (PDAs) and mobile devices. A peer-to-peer network is not limited to a wired line network and may be a wireless or wired line network or a hybrid network employing both wired line and wireless connections.

In the segmented peer-to-peer video-on-demand method and apparatus of the present invention, a video clip is divided into multiple equal length segments, denominated sub-clips. The playback time of the start of the sub-clip is defined as the deadline of this sub-clip. The leading sub-clips are streamed to the video playback device so that the users can start the playback immediately. Meanwhile, a peer-to-peer network is established among users in order to pre-fetch the data of the succeeding sub-clips. In accordance with the system performance aware scheme of the present invention, the data of a sub-clip has to be pre-fetched before its deadline. Once the playback of a sub-clip has started, no peer-to-peer downloading of that sub-clip is allowed since the newly downloaded data may be outdated. Complementary streaming from the original server is initiated from this point on for better system performance. Complementary streaming is described below.

An example is used to illustrate how segmented peer-to-peer video-on-demand of the present invention serves incoming requests. In this example, it is assumed that users are able to cache the entire copy of the video. The same technique applies even if only a portion of the video copy is cached. It is further assumed that the server only streams the first sub-clip and the data of following sub-clips are downloaded using the peer-to-peer network. The algorithm to compute the number of streamed sub-clips will be presented and described below.

Figure 1:
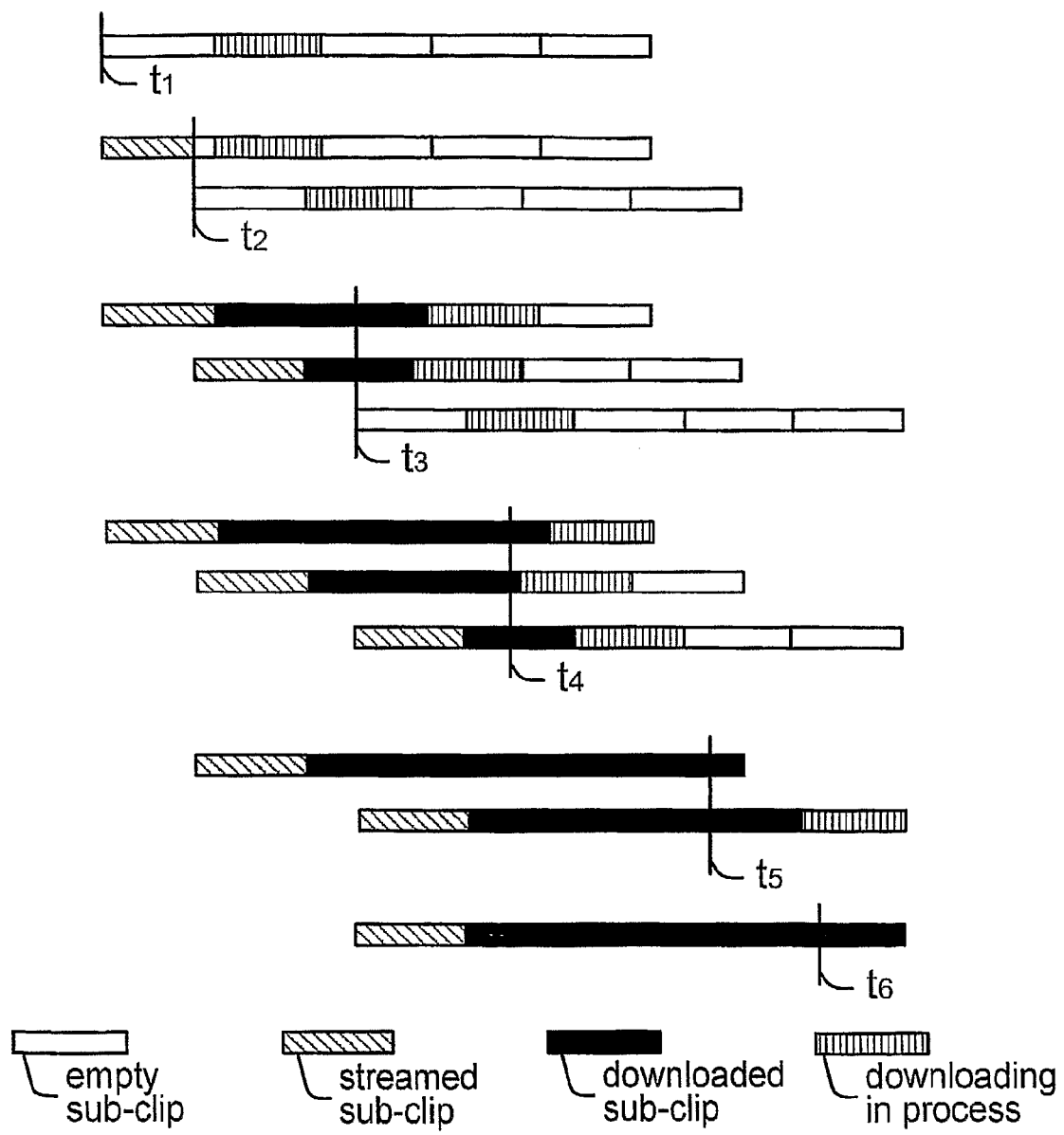
FIG. 1 is a schematic diagram of a peer-to-peer network in accordance with the present invention.

Referring now to FIG. 1, client/user 1 makes a request/demand for video from the server at time $t_1$. The server streams sub-clip 1 (the first video sub-clip) to client 1 immediately, so that client 1 can promptly commence playback. At the same time an attempt is made to locate a peer having/caching sub-clip 2 within the peer-to-peer network. At this moment, the only peer in the peer-to-peer network having/caching sub-clip 2 is the server, which can behave as a peer. Both client 1 and the server (at the least) are members of the peer-to-peer network. At time $t_2$, client 1 is playing back sub-clip 1, while sub-clip 2 is being downloaded (not streamed) from the server. Client/user 2 makes a request/demand for the same video from the server and immediately commences playback of sub-clip 1, which was streamed from the server to client 2. Both the server and client 1 commence downloading (not streaming) sub-clip 2 to client 2. At this moment, the server, client 1, and client 2 are peers in the peer-to-peer network. At time $t_3$, client 3 makes a request/demand for the same video from the server and immediately commences playback of sub-clip 1, which was streamed from the server. By now client 1 is playing back sub-clip 3 and is downloading the data/video of sub-clip 4. Client 2 is playing sub-clip 2 and downloading sub-clip 3. At this time, the server, client 1, client 2 and client 3 (at least) are members of the peer-to-peer network. Client 3 can download sub-clip 2 from the server, client 1, and client 2. As time progresses, peer video playback continues. The peer-to-peer downloading pre-fetches the data of the sub-clip that follows the sub-clip currently being played, as show in FIG. 1 with current time of $t_4$. By time $t_5$, client 1 has already finished its video playback and exited the system. Client 2 is playing back the last sub-clip and client 3 is playing back sub-clip 4 and downloading sub-clip 5. The server and the second client are peers in the peer-to-peer network for purposes of downloading sub-clip 5. At last, client 2 has also exited the system after finishing the video playback. Client 3 is watching/playing back sub-clip 5 and will exit the system at the end of sub-clip 5.

Figure 2:
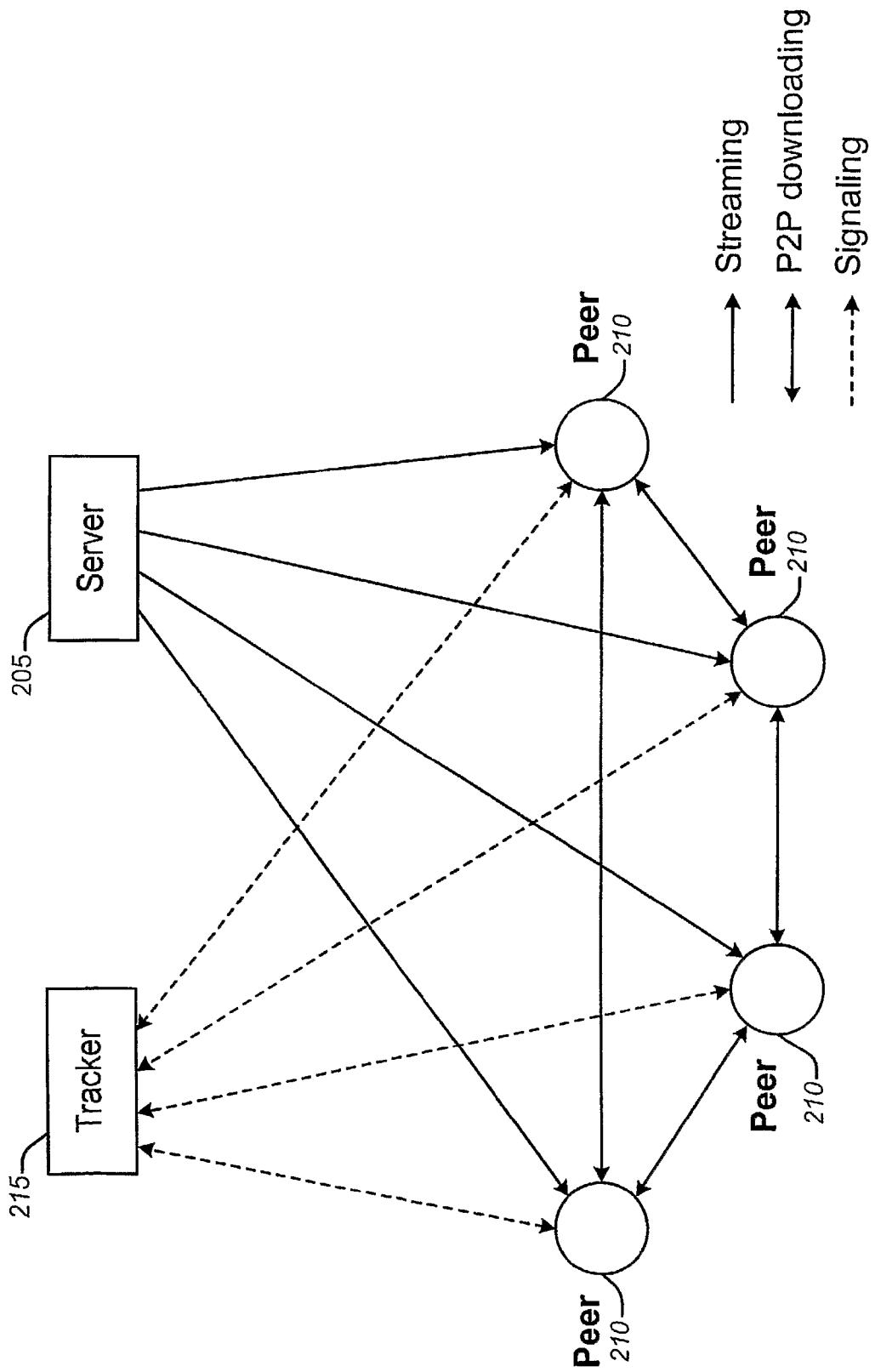
FIG. 2 is a diagram showing a peer-to-peer network in accordance with the present invention.

FIG. 2 is a diagram showing a peer-to-peer network in accordance with the present invention. The server 205 has the entire copy of the video and can stream the video sub-clips or behave as a peer and download sub-clips to the other peers 210 in the peer-to-peer network. Once a peer 210 requests/demands video from the server 205, it has joined the peer-to-peer network and can then download subsequent sub-clips from other peers 210 and/or download sub-clips to other peers 210. Sub-clips are only streamed from the server 205. Usually only the leading sub-clips are streamed from the server 205 to a peer 210 requesting/demanding video and the remaining sub-clips are downloaded from the server 205 or another peer 210. If, however, the downloading rate is not sufficient for the peer to receive the downloaded sub-clip before the deadline then it is possible to stream a subsequent sub-clip from the server to the peer. The tracker 215 may be implemented as a separate entity or may be implemented as part of the server 205. If the tracker 215 is implemented as a separate entity then there is signaling between the server 205 and the tracker 215, which keeps track of the peers in the peer-to-peer network as they join and exit the peer-to-peer network. The tracker also keeps track of which peers in the peer-to-peer network have what downloadable sub-clips and the status of the various peers (whether a peer has sub-clips that are available for downloading by another peer and which sub-clips are needed to be downloaded by each peer). Once a peer has received a sub-clip, the sub-clip is deemed to be available for downloading by that peer to other peers that need that sub-clip. The flow lines with double headed arrows indicate sub-clip downloading. The flow lines with single headed arrows indicate sub-clip streaming (only the server can stream). The dashed/broken flow lines indicate signaling.

Figure 3:
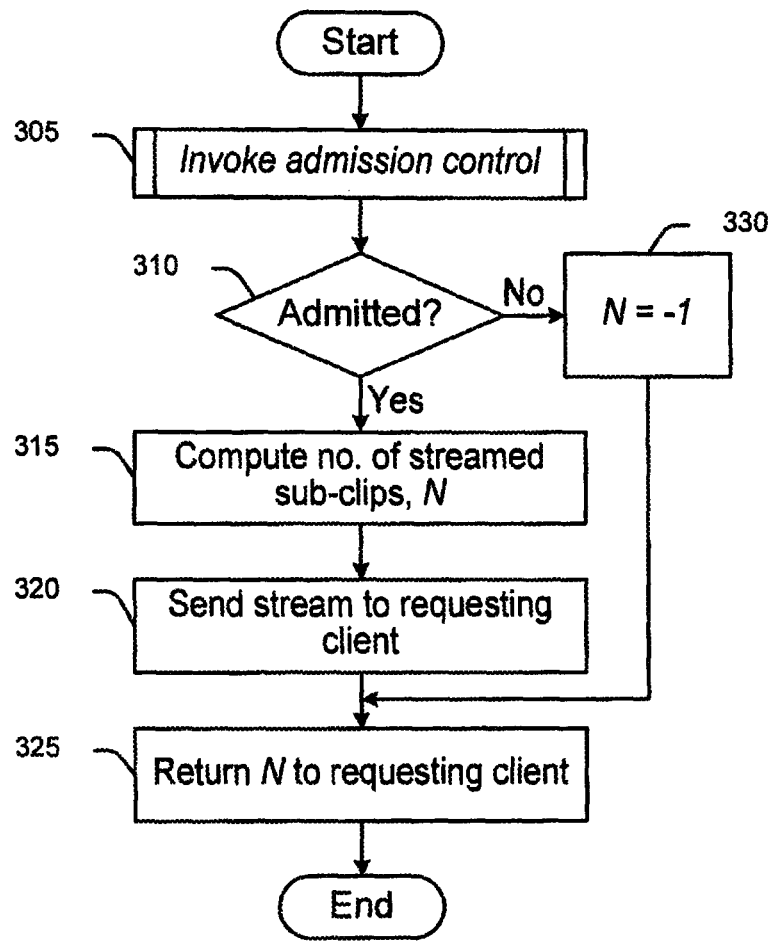
FIG. 3 is a flowchart of the admission control process from the server side.

FIG. 3 is a flowchart of the admission control process from the server side. A new request/demand for video is made to the server. Upon the arrival of the new request at the server, the admission control process 305 is invoked and proceeds based on collected statistics. If the request is admitted at 310, the number of leading sub-clips that should be streamed from the server directly is computed at 315. The number of streamed sub-clips (leading) is denominated N. The server starts to stream the leading sub-clips to the requesting client/user at 320 and return the value of N to the requesting user/client at 325. If the request/demand is not admitted the number of leading sub-clips is initialized/reset at 330.

Figure 4:
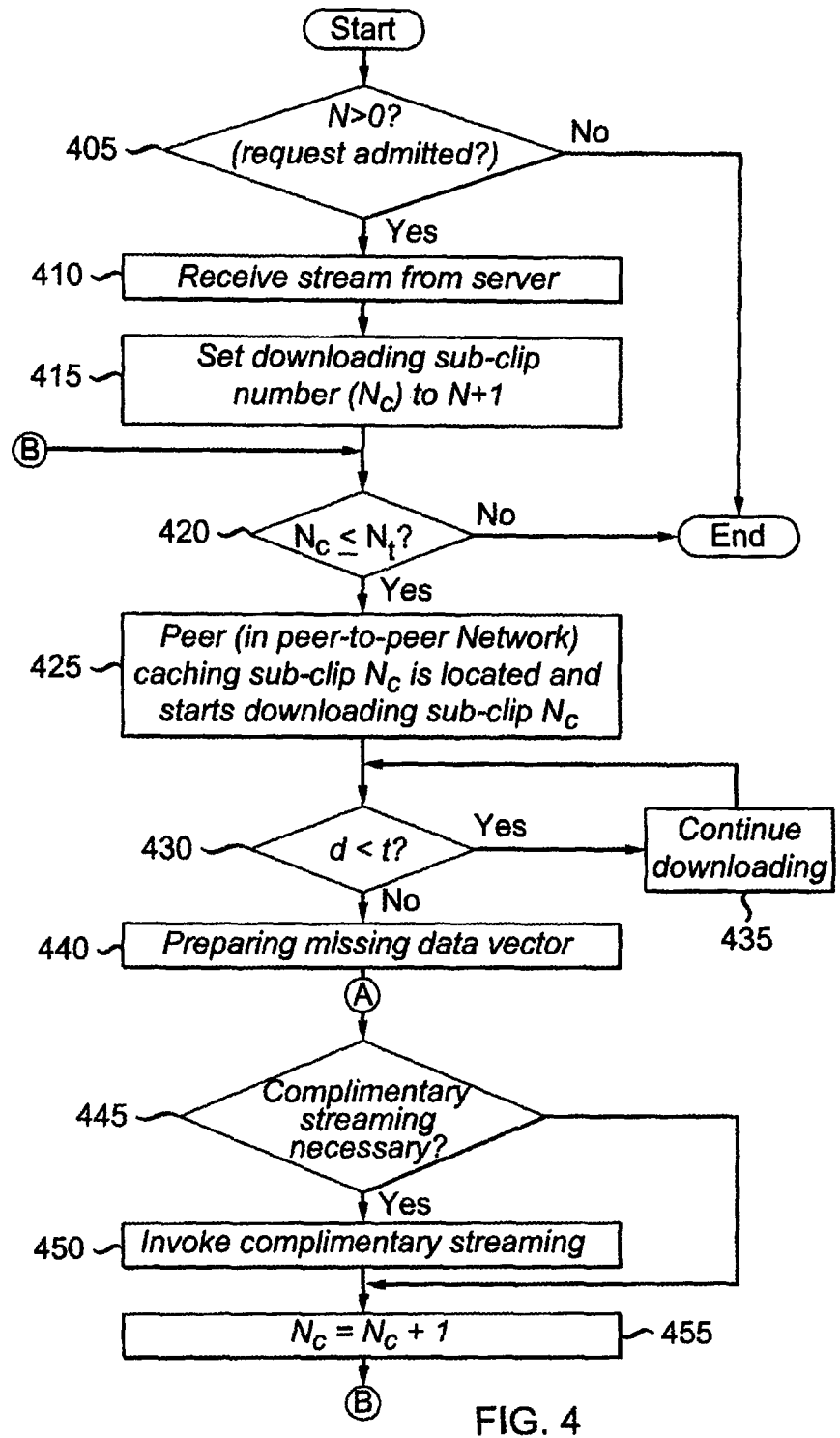
FIG. 4 is a flowchart depicting the admission control process from the user/client side.

FIG. 4 is a flowchart depicting the admission control process from the user/client side. At the user/client side, once the client receives the response from the server, a check is made to determine if the request/demand has been admitted by testing the value of N (the leading number of sub-clips to be streamed to the client from the server) at 405. If the value of N is greater than zero then the request/demand has been admitted and the user starts to receive the streamed N sub-clips at 410. It should be noted that setting N=−1 on the server side and testing for N>0 on the user/client side is but one possible implementation. The request admission test could, for example, be implemented by means of a flag or any other suitable means. The current sub-clip number, $N_c$, is set to N+1 (the next sub-clip—the sub-clip to be downloaded) at 415. A test is then performed at 420 to determine if there are more sub-clips to download. If either the request/demand was not admitted or all sub-clips of the video have been received by the user then the process ends. Meanwhile, a peer within the peer-to-peer network having/caching the (N+1)-st sub-clip is located and starts uploading the (N+1)-st sub-clip to the peer needing the (N+1)-st sub-clip at 425. If it is determined that the deadline, d, for the download (measured against the current time, t) has not been reached at 430 then the downloading continues at 435. If it is determined that the deadline, d, has been reached (as measured against the current time, t) at 430 then a missing data vector is prepared at 440. Actually the missing data vector is prepared slightly before the deadline or when it is determined that the download cannot be completed before the deadline, d. If the download cannot be completed before the deadline then a test is performed to determine if complementary streaming is necessary at 445. Complementary streaming will be described in greater detail below. Meanwhile, the current sub-clip counter is incremented at 455. If complementary streaming is required to ensure system performance (arrival of sub-clips by the user before the deadlines) is met then complementary streaming is invoked at 450. As the deadline, d, for downloading the (N+1)-st sub-clip is reached, the user starts to playback the (N+1)-st sub-clip and a peer within the peer-to-peer network having/caching the following sub-clip is located and starts the video sub-clip downloading process.

Next, the computation of the number of sub-clips to be streamed by the server is described.

Along with the request/demand, the client/user indicates to the server the estimated downlink bandwidth. It is believed that users may have better knowledge of their own downlink bandwidth. At the beginning of the video streaming by the server, the downlink bandwidth is consumed by both streaming and peer-to-peer downloading. Assuming that $n_i$ sub-clips are streamed by the server for user i, the copy of $(n_i+1)$-th sub-clip has to be downloaded before its deadline, i.e., $L*n_i$, where L is the duration of a sub-clip. Denoting $r_{playback}$ as the video's playback rate and $r_{downlink}$ as the user's downlink bandwidth, $(r_{downlink}-r_{playback})n_i L \geq r_{playback}$. "$n_i$" must be an integer (only complete sub-clips are streamed), hence $$n_i = \left\lceil \frac{r_{playback}}{r_{downlink} - r_{playback}} \right\rceil. \quad \text{(Equation 1)}$$

The segmented peer-to-peer video-on-demand service of the present invention that incorporates the peer-to-peer downloading into the traditional server-client video-on-demand service was described above. The peer-to-peer downloading carries the majority of the data/video transfer load, and, thus, significantly reduces the workload imposed on the server. In contrast to conventional peer-to-peer file downloading, where the goal is to maximize the overall system throughput, the peer-to-peer downloading of the present invention takes system performance (arrival of sub-clips at/by the user before their deadlines) into account and strives to meet the sub-clips' deadlines. The peer-to-peer downloading for a single sub-clip is described next. Then how to coordinate the peer-to-peer downloading across multiple sub-clips so as to achieve the timely delivery of data/video to all users is described.

The present invention uses data-driven peer-to-peer downloading to exchange the sub-clip data among users. The sub-clips of the present invention are divided into equal-sized blocks and users download the blocks from multiple users concurrently. The blocks are further subdivided into sub-blocks to enable pipelining of requests in order to reduce the signaling overhead. Corresponding to each sub-clip, there is a central component called a sub-tracker that keeps track of the users currently participating in the peer-to-peer downloading of a particular sub-clip. The sub-tracker receives updates from users periodically as well as when users join or leave the sub-clip peer-to-peer network.

Peers in a peer-to-peer network are classified into two categories: seeds and downloaders. Seeds are the users that have a complete/partial copy of the sub-clip and are willing to serve/upload the sub-clip to others. Seeds do not download the sub-clip data that they (seeds) are uploading to other peers because they (seeds) already have the data. Downloaders are the users that are still downloading the data but at the same time are willing to serve the blocks that they already have to others. When a new user starts to download a sub-clip, the user contacts the corresponding sub-tracker to obtain a list of the users currently in the peer-to-peer network (both seeds and downloaders) that have the sub-clip (or a portion of the sub-clip) and that are willing to upload the sub-clip. The new user then attempts to establish connections with the users on the list, which then become its neighbors.

The peers run a distributed algorithm to individually determine to which users the peer serves/uploads data. Several factors are considered in the selection process in order to maximize the chance that the most (maximum number of) users receive the sub-clip data before their respective deadlines expires.

Assume a user is chosen to receive the data from a neighbor (peer), and the neighbor has a choice of several blocks that the neighbor could download. The neighbor/peer employs a local rarest first (LRF) policy in selecting which block to download. The peer attempts to select for download a block that is least replicated among its neighbors. The goal is to maximize the diversity of content in the system, i.e., make the number of replicas of each block as equal as possible. This makes it unlikely that the system will get bogged down because of rare blocks that are difficult to find. In case the user has all the data that the neighbor has, the neighbor selects another user to which to serve/download the data.

Conventional peer-to-peer networks are designed to distribute a single file. In the present invention, a video clip is divided into multiple sub-clips, where each sub-clip is distributed using a peer-to-peer network. Hence, in the scheme method of the present invention a user may join multiple peer-to-peer networks simultaneously. For instance, in FIG. 1, the client 3 at time t4 is playing sub-clip 2. Client 3 has finished downloading sub-clip 2 and has been downloading sub-clip 3. So client 3 participates in three peer-to-peer networks, for sub-clips 1, 2, and 3, respectively. Client 3 is a seed in a peer-to-peer network for sub-clip 1 and a seed in (another) peer-to-peer network for sub-clip 2 and a downloader for yet another peer-to-peer network for sub-clip 3. Client 1 and client 2 are client 3's seeds for sub-clip 3. At time $t_4$ client 2 is downloading sub-clip 4, and client 1 is the seed for sub-clip 4 for client 2. Finally at time $t_4$, client 1 is downloading sub-clip 5 and the original server is the only seed for client 1 for sub-clip 5. Client 3 will not be able to serve client 1 and 2.

In the performance aware peer-to-peer network of the present invention for providing video on demand service, a user may join multiple peer-to-peer networks (a user may join a different peer-to-per network for each sub-clip). However, the total number of uploads should be a small number in order to avoid performance degradation by having a large number of open TCP connections. The question then becomes how to select uploading peers across multiple peer-to-peer networks so that the overall performance, i.e., the chance that all users retrieve the content/sub-clips before their respective deadlines, can be maximized. The following is a list of key factors that are believed to affect system performance.

1. How urgent the deadline is. The tighter the deadline is, the higher priority the downloader should get.
2. Is the downloading on schedule? All users should be treated fairly. Downloading should proceed proportionally to the time the peers have spent in the system since the downloading started.
3. How many potential seeds are available? Assuming the users depart immediately after finishing peer video playback, the number of available seeds is different for different sub-clips at different times. For instance, the number of seeds for sub-clip 2 for client 4 in FIG. 1 is greater than for sub-clip 3. This is because the seed of sub-clip 3 must also be the seed of sub-clip 2. Nevertheless the seed for sub-clip 2 may not be the seed for sub-clip 3 since the seed could leave the system after finishing the playback. In general, if the client arrival process is Poisson with average arrival rate of $\lambda$, the number of available seeds is governed by the following equation $N_i^{seed}=\lambda(L_{video}-iL))$ (Equation 2), where $N_i^{seed}$ denotes the average number of seeds for sub-clip i, $L_{video}$ denotes the video length, and L denotes the sub-clip length.
4. High uploading speed improves the system throughput and thus is preferential.

S denotes the size of sub-clip, and t denotes the current time. Let $x_j^k$ be the time when user j starts to download k-th sub-clip, and $s_j^k(t)$ be the amount of retrieved content up to time t. Further, let $d_j^k$ be the deadline for user j's k-th sub-clip. Lastly, define $p_j^k$ to be downloading progress indicator for client j's k-th sub-clip. Thus, $\rho_j^k=S(x_j^k-t)/[s_j^k(t)(x_j^k-d_j^k)]$ (Equation 3).

The value of $\rho_j^k$ reflects downloading progress. That is, $\rho_j^k$ indicates if the data/video downloading is on schedule. $S/(s_j^k-d_j^k))$ is the required downloading rate in order to retrieve the sub-clip on time (by the sub-clip deadline). $(x_j^k-t)$ is the elapsed time, and $x_j^k(t)/(x_j^k-t)$ is the attained downloading rate so far. The downloading progress indicator is the ratio of the required downloading rate and the achieved downloading rate. If $\rho_j^k=1$, the downloading is perfectly on schedule. If $\rho_j^k<1$, the downloading lags behind the schedule, and if $\rho_j^k>1$, the downloading is ahead of the schedule.

Now the metric used to determine to which neighbor a peer should send the data is discussed. Let $w_{ij}^k$ denote the uploading weight for peer i to serve/download the data to peer j for k-th sub-clip. The larger the value of $W_{ij}^k$ is, the more likely the peer i chooses to serve peer j. Let $w_{ij}^k$ be:

$$w_{ij}^k = \frac{r_{ij}}{\rho_j^k(d_j^k - t)(t - d_i^k)}. \quad \text{(Equation 4)}$$

The nominator is $r_{ij}$, which is the uploading speed/rate from peer i to j. Intuitively, greater/higher uploading speed improves the overall system throughput. Hence, a larger uploading rate is better. This goes to factor 4 above.

There are three terms in the denominator in Equation (4). As defined in Equation (3), $\rho_i^j$ is the progress indicator and small value of $\rho_i^j$ indicates peer j is behind schedule. Hence, high priority should be given to j in accordance with factor 2 above. The value of $(d_j^k-t)$ is the time to the deadline. The smaller the value of $(d_j^k-t)$ is, the tighter the deadline is according to factor 1. Priority should be given to the request with tightest deadline. Finally, all sub-clips k, $k\in\{k|d_j^k<t\}$ of peer i are seeds by time t. However, the request for different sub-clip has different number of seeds, as shown by Equation (2). Priority should be given to the user request that has the least number of seeds. The longer the time has elapsed, the more seeds are available for this request, which justifies the last term in the denominator (in accordance with factor 3).

As discussed above, although extra care is taken to address the performance issues (timely arrival of the sub-clips at/by the user), some data may still be missing by the time of deadline (or shortly before the deadline) when peer-to-peer downloading ceases. How to use the server to stream the missing data so as to further improve the peer video playback performance is now described. This is called complementary streaming herein. As the deadline approaches, the peer client prepares a missing data vector $V_{missing}$, which is a bit map that uses a first flag, for example "1" to indicate that a block is received, and a second flag, for example "0" to indicate a block is still missing. The missing data vector is sent to the server (signaling) together with the deadline for the sub-clip to arrive at the user. The server starts to stream out the missing data as the deadline approaches so that the missing data/video can be filled in time for the peer video playback.

The server of the present invention is responsible for three things, (i) serving the initial/leading sub-clips to support prompt playback (by streaming); (ii) providing complementary streaming to improve the users' viewing quality (ensuring that the sub-clips arrive at the user before each sub-clip deadline), and (iii) serving as a seed in peer-to-peer data/video downloading. Tasks 1 and 2 have higher priority than task 3.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for a peer to receive content, said method comprising:
receiving a streamed leading content sub-clip;

determining a set of needed content sub-clips;

locating one of said set of needed content sub-clips;

calculating a deadline for downloading said located content sub-clip, wherein the deadline for downloading said located content sub-clip is a playback time of a start of said located content sub-clip;

determining if said deadline for downloading said located content sub-clip will be met; and downloading said located content sub-clip from multiple peers simultaneously if said deadline for said located content sub-clip will be met, preparing a missing data vector if said deadline for downloading said located content sub-clip will be exceeded; and invoking complementary streaming for blocks of said located content sub-clip for which said deadline will be exceeded.

2. The method according to claim 1, further comprising requesting a unit of content.

3. The method according to claim 1, further comprising joining a peer-to-peer network to obtain said located content sub-clip.

4. The method according to claim 1, further comprising:

segmenting blocks of needed content sub-clips into sub-blocks;

pipelining requests for said sub-blocks; and forwarding status.

5. The method according to claim 4, wherein said status includes downloading status, status of peer-to-peer network participation and status of cached content.

6. The method according to claim 1, wherein said locating step further comprises:

signaling a sub-tracker to determine a location and status of said needed content sub-clips; and selecting said location from which to request said located content sub-clips.

7. The method according to claim 6, wherein said selecting step is based on a least rarest first scheme.

8. The method according to claim 1, further comprising calculating a downloading progress indicator.

9. The method according to claim 8, wherein said downloading progress indicator is a ratio of a required downloading rate and an achieved downloading rate.

10. The method according to claim 1, further comprising calculating an uploading weight.

11. The method according to claim 1, further comprising: setting a pointer to a next needed content sub-clip.

12. The method according to claim 11, further comprising incrementing said pointer.

13. The method according to claim 11, further comprising joining a peer-to-peer network to obtain said next needed content sub-clip.

14. A peer-to-peer system, comprising:

a hardware processor coupled to a server;

a hardware processor coupled to a peer; and a tracker, wherein said tracker and said server are one of co-located and not co-located, wherein said server is a seed, wherein said peer is a downloader, wherein said peer is further configured to:

receive a streamed leading content sub-clip;

determine a set of needed content sub-clips;

locate one of said set of needed content sub-clips;

calculate a deadline for downloading said located content sub-clip;

determine if said deadline for downloading said located content sub-clip will be met;

download said located content sub-clip from multiple peers simultaneously if said deadline for said located content sub-clip will be met;

prepare a missing data vector if said deadline for downloading said located content sub-clip will be exceeded; and invoke complementary, streaming for blocks of said located content sub-clip for which said deadline will be exceeded.

15. The system according to claim 14, wherein said peer is further configured to request a unit of content.

16. The system according to claim 14, wherein said peer is further configured to join a peer-to-peer network to obtain said located content sub-clip.

17. The system according to claim 14, wherein said peer is further configured to:

segment blocks of needed content sub-clips into sub-blocks;

pipeline requests for said sub-blocks; and forward status.

18. The system according to claim 14, wherein said peer configured to locate one of said set of needed content sub-clips is further configured to:

signal a sub-tracker to determine a location and status of said needed content sub-clips; and select said location from which to request said located content sub-clips.

* * * * *